: 3,037,877
RESINOUS CONDENSATION PRODUCTS AND PROCESS
Le Roi E. Hutchings, Lakewood, Ill., assignor to Pure Oil Company, Chicago, Ill., a corporation of Ohio
No Drawing. Filed July 27, 1959, Ser. No. 829,487
10 Claims. (Cl. 106—316)

This invention relates to condensation products of high-molecular-weight aromatic and heterocyclic compounds and their preparation from selected petroleum fractions. More particularly, the invention relates to compositions, and the method of preparation, comprising the reaction product of solvent extracts (hereinafter to be defined) rich in high-molecular-weight polycyclic aromatic hydrocarbons and heterocyclic compounds, having mixed hydrocarbon substituent groups attached to the rings, with a lower-molecular-weight aromatic hydrocarbon and an aliphatic reactant, in the presence of a condensation agent. The compositions of this invention are characterized by the high-molecular-weight, complex, aromatic hydrocarbons and heterocyclic compounds used as starting materials, and the end-products are useful as plasticizers and plasticizer extenders for various resins such as polyvinyl chloride resins.

It is known in the art that various materials such as n-butyl acetyl recinoleate, butyl oleate, butyl phthalate, butyl glycolate, n-butyl stearate, dibutyl phthalate and triphenyl phosphate find utility as plasticizing agents for resins, particularly for polyvinyl chlorides. The purpose for these plasticizing agents is to increase the flexibility, workability and/or shock-resistance of the resin. Plasticizer extenders are materials which may be substituted for a portion of the plasticizer normally added to a resin without seriously affecting the mechanical properties of the plasticized resin. The plasticizing agents are polar organic compounds of relatively low volatility, and are usually esters. These materials are, however, expensive and in many instances large amounts of the plasticizers are required. The compositions of this invention overcome, at least in part, some of these problems in that a plasticizing agent or plasticizer extending agent is formed from relatively inexpensive materials and the end-product has utility over broad temperature ranges to form solid plastics which meet many of the desired properties of these materials. Accordingly, it becomes a primary object of this invention to provide a method for preparing plasticizing agents or plasticizer extenders for resins from solvent extracts containing complex, substituted aromatic hydrocarbons and heterocyclic compounds.

An object of this invention is to provide compositions containing condensation products of solvent extracts rich in complex, substituted aromatic hydrocarbons and heterocyclic compounds.

An object of this invention is to provide a process for utilizing petroleum fractions containing complex, substituted aromatic hydrocarbons and heterocyclic compounds.

An object of this invention is to provide compositions containing the condensation products of petroleum fractions rich in complex, substituted aromatic hydrocarbons and heterocyclic compounds with a lower-molecular-weight aromatic hydrocarbon and an aliphatic reactant, in the presence of a condensation agent.

A further object of this invention is to provide a process wherein petroleum fractions rich in complex, substituted aromatic hydrocarbons and heterocyclic compounds are reacted with a lower-molecular-weight aromatic hydrocarbon and an aliphatic reactant in the presence of a condensation agent.

Another object of this invention is to provide compositions containing condensation products of complex, substituted aromatic hydrocarbons and heterocyclic compounds derived from solvent extracts, which hydrocarbons and heterocyclic compounds are characterized by their high molecular weight and the presence of mixed hydrocarbon substituent groups attached to the rings, same being compounds containing carbon and hydrogen, and in some instances also sulfur, oxygen, or nitrogen.

Another object of this invention is to provide compositions, and their method of preparation, containing the condensation products of solvent extracts obtained in the solvent refining of mineral lubricating oils, which are characterized by being rich in or containing reactable amounts, in the order of 50% to about 100% by weight, of complex, substituted aromatic compounds and heterocyclic compounds predominating in carbon and hydrogen and in some cases also containing sulfur, oxygen and nitrogen, with lower-molecular-weight aromatic hydrocarbons and an aliphatic reactant, in the presence of a condensation agent.

An object of this invention is to provide a process and composition utilizing solvent extracts obtained in the solvent refining of mineral lubricating oils.

Another object of this invention is to prepare compositions by reacting solvent extracts from lubricating oils with paraformaldehyde and an added lower-molecular-weight aromatic hydrocarbon in the presence of a condensation agent.

Another object of this invention is to prepare plasticizing agents and plasticizer extenders from the complex, polysubstituted aromatic hydrocarbons and heterocyclic compounds contained in solvent extract from lubricating oil manufacture.

Still another object of this invention is to provide plasticizing agents and plasticizer extenders for resins by upgrading lubricating oil extracts wherein the extracts are reacted with paraformaldehyde and a lower-molecular-weight aromatic hydrocarbon in the presence of a condensation agent.

These and other objects of the invention will become apparent or be described as the specification proceeds.

It is known in the art to chloromethylate various aromatic compounds by using formaldehyde with hydrogen chloride and a condensation agent. The process involves the replacement of a hydrogen atom by a chloromethyl group on the aromatic ring. The process may be illustrated by the early synthesis of benzyl chloride carried out by Grassi and Maselli in 1898 wherein benzene, hydrogen chloride, paraformaldehyde and zinc chloride were used. Many of the known, relatively simple aromatic compounds have been subjected to this reaction. Where certain condensation agents are used, the instant invention is a departure therefrom in that the chloromethylation reaction is used as a step in a more complex condensation using the complex, substituted aromatic compounds or heterocyclic compounds, as hereinafter defined, as building blocks for the reaction products.

The present invention is predicated on the discovery that solvent extracts containing complex, aromatic hydrocarbons and heterocyclic compounds of high molecular weight containing mixed, hydrocarbon-substituent side chains, and characterized by containing not only compounds of carbon and hydrogen but also compounds of sulfur, oxygen and/or nitrogen, may be condensed with an added, low-molecular-weight aromatic hydrocarbon and an aliphatic reactant, in the presence of a condensation agent, to produce valuable products. One source of the above-defined complex hydrocarbons and heterocyclic compounds is represented by the extracts obtained in solvent refining mineral oils, particularly lubricating oil fractions. These extracts, hereinafter referred as solvent extracts, are obtained as the extract or solvent phase when lubricating oils are refined by treatment with a selective solvent having an affinity for the aromatic, complex, condensed ring compounds, particularly those containing relatively short side-chains. The complex hydrocarbons and heterocyclic compounds removed by this refining treatment are generally characterized by aromaticity and polycyclic rings, and the extracts may also contain appreciable amounts of sulfur, oxygen, and/or nitrogen compounds. These complex hydrocarbons and heterocyclic compounds contain a predominance of polycyclic rings of aromatic nature and of condensed configuration, with mixed hydrocarbon substituent groups attached thereto as side-chains. These starting materials are of a generally viscous nature, have low viscosity indices, and are considered to be deleterious in lubricating oils. Heretofore, these aromatic extracts have been regarded as waste products and because they are exceedingly complicated mixtures of complex compounds, including various sulfur-, oxygen-, and nitrogen-containing compounds, they have not been used successfully in preparing petrochemicals or as sources of hydrocarbon reactants or starting materials.

I have discovered that, despite these drawbacks and the previous art showing unsuccessful attempts at their utilization, the above-defined complex mixture of compounds from solvent extracts obtained in lubricating oil manufacture can be successfully utilized to prepare valuable condensation products useful as plasticizers and plasticizer extenders. More particularly, I have discovered that the afore-defined complex aromatic hydrocarbon and heterocyclic starting materials, particularly as represented by solvent extracts from lubricating oil manufacture, containing about 50 percent by weight to about 100% by weight of active ingredients, can be reacted with a lower-boiling aromatic compound, such as toluene, and formaldehyde in the presence of phosphorus oxychloride to give valuable end-products.

The exact mechanism of the present reaction is not known and the invention is not to be limited to any possible theories of the reaction that are advanced. Because of the nature of the products, it is theorized that one or more of the following reactions may be taking place.

The mixture of complex, aromatic hydrocarbons and heterocyclic compounds used as the starting material for the present reaction may be represented by the following formulae, for simplification:

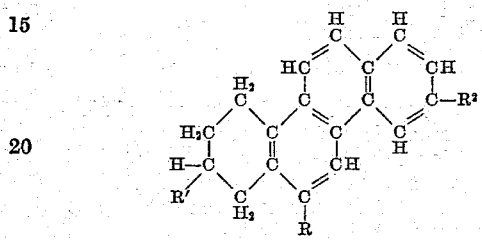

Complex aromatic hydrocarbon and/or

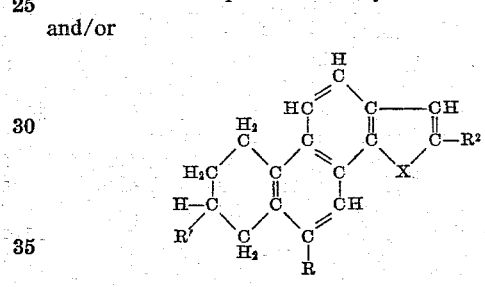

Heterocyclic compound wherein X may be sulfur, oxygen, or >NH, and R, $R^1$ and $R^2$ are the same or different alkyl groups having from 1–20 carbon atoms (usually less than 6), at least one containing branched hydrocarbon chains. When the foregoing complex hydrocarbon or heterocyclic compound is brought into contact with toluene, $POCl_3$ and $CH_2O$, the following reactions may take place:

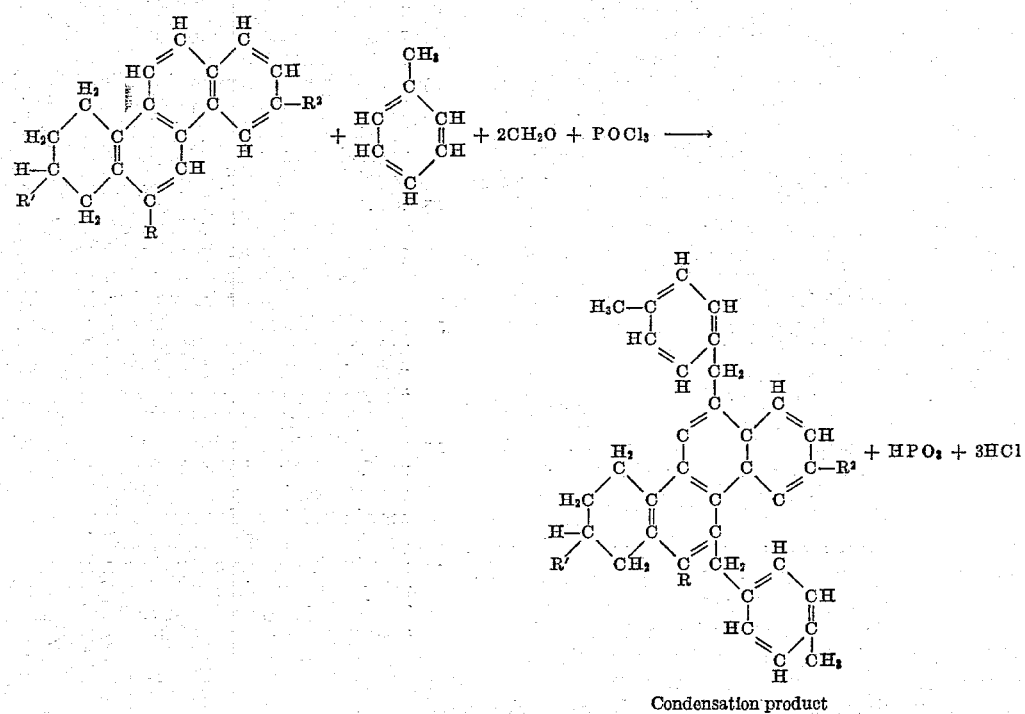

Condensation product

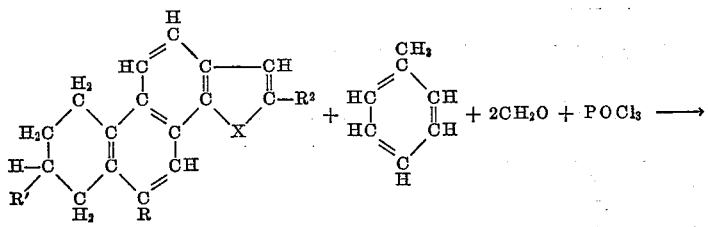

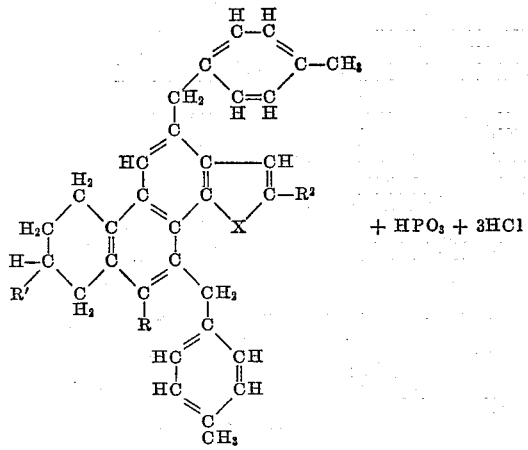

Condensation product

The preferred starting materials used in accordance with this invention are well known in the art and are adequately described as those aromatic materials separated from or contained in mineral lubricating oils and their fractions, i.e., those aromatics obtained in the refining of neutral oils and bright stocks during treatment with a selective solvent to extract the predominantly aromatic materials from the paraffinic materials. Solvent extracts resulting from the treatment of mineral lubricating oils for the purpose of separating non-aromatic hydrocarbons (to raffinate and finished oil) from the aromatic hydrocarbons (the extract and waste product) are preferred as starting materials.

Since the general process of refining mineral lubricating oils in which solvent extracts are obtained is well known, it is only necessary for present purposes to describe a typical procedure for obtaining same and give some examples by way of illustration.

In a typical operation, desalted crude oil is first charged to a distillation unit where straight-run gasoline, two grades of naphtha, kerosene, and virgin distillate are taken off, leaving a reduced crude residue. The reduced crude is continuously charged to a vacuum distillation unit where three lubricating oil distillates are taken off as side streams, a light distillate is taken off as overhead, and a residuum is withdrawn from the bottom of the tower. This residuum is charged to a propane deasphalting unit wherein propane dissolves the desirable lubricating oil constituents and leaves the asphaltic materials. A typical vacuum residuum charge to the propane deasphalting unit may have an API gravity of 12.9°, viscosity SUS at 210° F. of 1249, flash of 585° F., fire of 650° F., C.R. of 13.9 weight percent, and is black in color. The deasphalted oil may have an API gravity of 21.5° to 21.8°, viscosity SUS at 210° F. of 165–175, NPA color of 6–7, flash of 575° F., fire of 640° F., and C.R. of 1.7–2.0. The deasphalted residual oil and various lubricating oil distillates from the reduced crude may be used in this reaction without further treatment or may be separately subjected to solvent extraction for the separation of non-aromatic from aromatic constituents prior to use. The refined oil or "raffinate" from the extraction processes is used per se, or as blending stock for lubricating oils, and the solvent extract, predominating in aromatic constituents, is the by-product useful in accordance with this invention.

For example, a crude oil from an East Texas field with an API gravity of 33.1, was topped to remove such light fractions as gasoline, naphtha, kerosene, and light lubricating distillate. The vacuum residue was a reduced crude having a viscosity of 1251 SUS at 210° F., 2.2 percent sulfur, and an API gravity at 12.6. After propane deasphalting, the oil had a viscosity of 174 SUS at 210° F. and an API gravity of 21.7. This deasphalted oil was treated with phenol to produce a raffinate from which an aviation lubricating oil may be prepared. The oil extracted by phenol treatment, after removal of phenol, is ready for use as a starting material in accordance with this invention. The extracts obtained from the distilate lubricating oil fractions by extraction with phenol are also reactant materials for this invention, and are preferred.

Solvents other than phenol may be used to obtain the extraction product for reaction in accordance with this invention; for example, liquid sulfur dioxide, nitrobenzene, Chlorex (2,2'-dichloroethyl ether), chlorophenol, trichloroethylene, cresylic acid, pyridine, furfural, or the Duo-Sol solution, comprising 150 to 400% liquid propane and 125 to 400% cresol based on charge stock, may be used. When using phenol, it is possible to vary the characteristics of the extract products considerably by adjustment of the amount of water present in the phenol. A fraction of low viscosity index can be obtained by using phenol containing water during the extraction, and a fraction of high viscosity index can be obtained by using anhydrous phenol. Following are some characteristics of typical extraction products from lubricating oil stocks, derived from various crude oils, and other source hydrocarbon materials, which may be used in accordance with this invention.

TABLE I

*Sources and Physical Characteristics of Solvent Extracts*

| Ext. No. | Crude source | Solvent | API grav. | Sp. gr. at 60° F. | Saybolt univ. vis (sec.) | | | V.I. | Pour (° F.) | Flash (° F.) | Fire (° F.) | Iodine number (Wijs) | Percent C.R. | Percent sulfur |
|---|---|---|---|---|---|---|---|---|---|---|---|---|---|---|
| | | | | | 100° F. | 130° F. | 210° F. | | | | | | | |
| 1 | East Texas | Phenol | 11.1 | 0.9923 | 23,319 | 4,750 | 282 | −40 | +55 | | | | 7.2 | 2.66 |
| 2 | ----do---- | ----do---- | 15.4 | 0.9632 | 15,000 | | 285 | +39 | | | | | | |
| 3 | ----do---- | ----do---- | 12.6 | 0.9820 | 36,410 | 4,310 | 310.1 | −1 | +80 | | | | 4.7 | 2.27 |
| 4 | ----do---- | ----do---- | 14.6 | 0.9685 | 19,500 | 4,305 | 313 | +27 | +90 | | | | 4.7 | 2.2 |
| 5 | ----do---- | ----do---- | 15.4 | 0.9632 | 32,500 | | 372 | +5 | +60 | | | | 4.13 | 2.33 |
| 6 | ----do---- | ----do---- | 13.7 | 0.9745 | 25,000 | 5,400 | 355 | +27 | +80 | | | | | 2.18 |
| 7 | ----do---- | ----do---- | 8.6 | 1.0100 | 145,000 | 19,000 | 616 | 0 | +70 | | | | | |
| 8 | ----do---- | ----do---- | 10.5 | 0.9965 | 12,676 | 2,514 | 172.1 | −101 | +60 | | | | | 2.88 |
| 9 | Sante Fe Springs | ----do---- | 10.2 | 0.9986 | | | 371 | | +65 | 520 | 600 | 69.4 | | |
| 10 | Texas | Furfural | 13.0 | 0.9791 | | | 1,500 | | +85 | 470 | 515 | 57.1 | | |
| 11 | Pennsylvania | Chlorex | 12.2 | 0.9847 | | | 1,365 | | +85 | 560 | 630 | 71.4 | | |
| 12 | ----do---- | Nitrobenzene | 10.0 | 1.000 | | | 1,500 | | +75 | 555 | 640 | 60 | | |
| 13 | Mid Cont | Propanecresol | 14.4 | 0.9698 | | | 1,500 | | +100 | 540 | 605 | 63.7 | | |
| 14 | ----do---- | Phenol | 13.6 | 0.9752 | | | 41.7 | −82 | +20 | | | | | |
| 15 | ----do---- | Chlorex | 13.6 | 0.9752 | | | 200 | −61 | +75 | | | | | |
| 16 | ----do---- | Phenol | 8.9 | 1.0078 | | | 569 | | +75 | | | | | |
| 17 | ----do---- | Furfural | 14.9 | 0.9665 | | | 50.2 | 25 | +20 | | | | | |
| 18 | East Texas | Phenol | 13.5 | 0.9759 | 25,000 | | 341 | 17 | +65 | 530 | 610 | | 4.76 | 2.36 |
| 19 | ----do---- | ----do---- | 8.2 | 1.0129 | 2,007 | | 71.1 | −129 | +20 | 450 | | | | 3.2 |
| 20 | ----do---- | ----do---- | 11.7 | 0.9881 | 1,025 | | 61.7 | −46 | +45 | 420 | | | | 2.8 |

The solvent extracts from lubricating oils used as starting materials for this invention have the following general properties and characteristics:

TABLE II

| Characteristic: | Range of values |
|---|---|
| Gravity, ° API | 7.3–17.9. |
| Gravity, sp., 60° F./60° F. | 0.9471–1.0195. |
| Viscosity, SUS, @ 100° F. | 154–230,000 (ext.). |
| Viscosity, SUS, @ 130° F. | 80–20,800. |
| Viscosity, SUS, @ 210° F. | 40.7–796. |
| Viscosity index | −153 to +11. |
| Pour point (max.) | +20–80. |
| Color, NPA | +3–6 (double diluted). |
| Molecular weight, average | 300–600. |
| Boiling point (initial), ° F. | 400 to 900+. |
| Boiling point (end), ° F. | 800 to 1026+. |
| Sulfur, percent wt | 2.0–3.2. |
| Sulfur compounds, percent wt | 10–40. |
| Aromatics and thio-compounds | 67–91. |
| Av. no. of rings/arom. mol | 1.7–3.5. |
| H/C wt. ratio | 0.116–0.136. |
| H/C atom ratio, whole sample | 1.383–1.622. |
| H/C atom ratio, aromatics portion | 1.289–1.500. |

The gravities of the extracts in general increase with increase in the viscosity of the raffinate at a constant viscosity index. Stated otherwise, the gravities of these extracts increase with decrease in viscosity index of the raffinate at a constant viscosity. For the production of 100±5 VI neutral oils, the viscosities of the extracts increase with increase in stated viscosities of the neutral oils (raffinates). The pour points of extracts are high and are affected by changes in the depth of extraction. The sulfur contents are also affected by the depth of extraction. The solvent extracts are characterized by containing aromatic and sulfur compounds in the range of 67–91%, the remainder being principally saturates, or material behaving as saturates, together with a minor proportion of organic acids. The organic acids present are not susceptible to extraction by the use of aqueous strong caustic because of the solubility of the salts in the extract. No asphaltic material is present in solvent extracts and they contain no material volatile at room temperatures.

The materials shown in Tables I and II are merely illustrative and the invention is not to be limited thereby.

It is apparent that the composition and characteristics of the condensation products prepared in accordance with the present process will vary somewhat depending on the concentration and types of complex aromatic hydrocarbons and heterocyclic starting materials selected from the general class hereinbefore defined.

It is to be understood, accordingly, that the invention is broadly applicable to any petroleum fraction which contains from about 50–100% by weight of complex aromatic hydrocarbons as herein defined. It is to be understood that the invention is particularly applicable to any solvent extract from the refining of mineral lubricating oils for the purpose of separating non-aromatic and aromatic hydrocarbons, that is, where the solvent exerts a preferential selectivity for the non-paraffinic constituents. The extracts are substantially freed of solvent, e.g., phenol extracts are dephenolized by steam stripping so that they contain practically no phenol.

In carrying out the process of this invention, the mixture of complex, aromatic hydrocarbons and/or heterocyclic compounds is condensed with an added, lower-boiling aromatic hydrocarbon and an aliphatic reactant such as paraformaldehyde, in a condensing agent present, to give products which exhibit plasticizing or plasticizer extender action on resins such as polyvinyl chloride resins. Various known procedures for conducting such condensation reactions may be applied to the instant process. The reaction may be carried out by adding a condensing agent gradually over a 10 to 30 minute period to a mechanically-agitated mixture of the complex, aromatic hydrocarbons, and/or heterocyclic compounds, the aliphatic reactant, and the added lower-boiling aromatic hydrocarbon. After the addition of the condensing agent, the mixture is stirred for about 2 to 5 hours, and then the mixture is thoroughly agitated with about 10 to 100 parts of water. After settling, the oily layer is separated, diluted with a suitable solvent such as benzene, filtered, and washed with water. Successive washes in sequence with dilute caustic and water may be applied, and finally, any solvent medium is removed by distillation.

The added, lower-molecular-weight, aromatic hydrocarbon for the reaction may be any aromatic hydrocarbon boiling from the boiling point of benzene to about 600° F. Such aromatic hydrocarbons are characterized by having at least one labile hydrogen atom on the ring or rings. This lower-boiling aromatic reactant may contain 1 to 2 aromatic rings, either linked or condensed, and may contain one or more substituent alkyl groups and/or other groups. Included are such aromatic compounds as benzene, toluene, ethylbenzene, diethylbenzene, butylbenzene, propylbenzene, isopropylbenzene, sec-butylbenzene, tertiary-butylbenzene, m-xylene, o-xylene, p-xylene, mesitylene, polymethylbenzene, halogen derivatives of polymethylebenzenes, bromomesitylene, chloromesitylene, iodomesitylene, naphthalene, 1-methylnaphthalene, anisole, 2-methylnaphthalene, 1-ethylnaphthalene, 1-butylnaphthalene, octylnaphthalene, phenols, cresols, α-naphthol, β-naphthol, 1,3,5-triisopropylbenzene, p-nitrophenol, acetomesitylene, cumene, pseudocumene, p-cymene, isobutyl-p-cymene, t-amylbenzene, p-t-butylethylbenzene, p-t-butyltoluene, dibenzyl, hydrindrene, tetralin, acenaphthalene, chlorobenzene, p-dichlorobenzene, o-chlorotoluene, p-chlorotoluene, p-bromotoluene, bromodurene, bromoisodurene, bromoprehnitene, 1-chloro-1-mesetylpropane, durene, isodurene, prehnitol, 1,3-dimethyl-5-t-butylbenzene, 1,3,5-triethylbenzene, 1,3,5-triisobutylbenzene, cyclohexylbenzene, diphenyl, dimethyl diphenyl, methyl diphenyl, α-methylnaphthalene, and β-methylnaphthalene.

The aliphatic reactant used in carrying out the reaction may be formaldehyde, used as a formalin solution, or it may be generated by the depolymerization of paraformaldehyde, or trioxymethylene, for use in the reaction mixture. In the literature, the term paraformaldehyde is used in referring to polyoxymethylenes which are polymers having the following probable structure.

$$HOCH_2O(CH_2O)_nCH_2OH$$

The trimer $(CH_2O)_3$, melting at 62–63°, is called alpha-trioxymethylene and is anhydrous, whereas paraformaldehyde generally contains from 2 to 5% of water. Instead of using formaldehyde, the reaction may be carried out using diethylformal, dimethylformal, chloromethylether or dichloromethylether.

The condensation agent may be phosphorus oxychloride, hydrochloric acid, phosphoric acid zinc chloride, concentrated sulfuric acid, acetic acid, anhydrous aluminum chloride, anhydrous aluminum chloride fused with zinc chloride, anhydrous hydrogen fluoride, anhydrous boron trifluoride, and mixtures of such condensation agents.

Various combinations of an aliphatic reactant and a condensation agent as just defined may be used, and to some extent the reaction products will vary depending on the techniques used and the combinations of reactants employed. Formaldehyde and hydrochloric acid or phosphorus oxychloride work well in the reaction. Diethylformal or dimethylformal and hydrochloric acid or phosphorus oxychloride may be used successfully, although these two aliphatic reactants also work without a condensation agent. A mixture of formalin or paraformaldehyde and hydrochloric acid in the presence of zinc chloride may be used, and paraformaldehyde and hydrochloric acid in acetic acid solution is another example.

The condensation reaction may be carried out at temperatures ranging from about 20° C. to 100° C. (68–212° F.), or even as high as the boiling points of the reactants. Atmospheric pressures are generally used, although the application of pressures up to 30 p.s.i. may promote the condensation. No special precautions, except possible cooling of the reaction mixture, need be taken in conducting the reaction. It is only expedient and time-having to thoroughly agitate the reactants and incorporate the last added reactant or reactant mixture thoroughly.

In order to demonstrate the invention, a series of experiments was conducted as outlined in Table III, using a phenol extract from the production of 200 vis., 90 VI oil. Extract Sample Number 19 in Table I was used. The extract was in each instance condensed with toluene using paraformaldehyde as the aliphatic reactant and phosphorus oxychloride as the condensation agent. One product was prepared using anhydrous aluminum chloride in place of phosphorus oxychloride. The proportions of the reactants, reaction conditions, product yields, and the plasticizing effectiveness of the resulting products are shown in the table.

TABLE III

| Run No. | Extract oil (g.) | Paraformaldehyde (g.) | Toluene (g.) | Condensing agent (g.) | Temp. (° F.) | Yield of product (g.) | Plasticizing action toward polyvinyl chloride [1] |
|---|---|---|---|---|---|---|---|
| 1 | 30.0 (0.2 mole) | 7.5 (0.25 mole) | 9.2 (0.1 mole) | POCl₃ (15.3) (0.1 mole) | 79–108 | 34.7 | A. |
| 2 | do | do | 18.4 (0.2 mole) | do | 81–93 | 33.9 | B. |
| 3 | do | do | 36.8 (0.4 mile) | do | 81–86 | 33.6 | C. |
| 4 | do | do | 73.6 (0.8 mole) | do | 82–88 | 31.5 | D. |
| 5 | do | do | 18.4 (0.1 mole) | AlCl₃ (13.3) (0.1 mole) | 79–99 | 35.1 | E. |
| Straight extract oil | | | | | | | F (none). |

[1] Products are listed in descending order of effectiveness as plasticizing agents, that is, the product from Run 1 was better than the product from Run 2, etc. Straight extract oil had no plasticizing effect, nor was it a plasticizer for polyvinyl chloride.

From the above results it is to be observed that the unreacted aromatic extract oil had no plasticizing, or plasticizer-extender properties. The condensation products obtained using phosphorus oxychloride as the condensing agent were less viscous as greater amounts of toluene were used in the condensation. The product formed from the condensation of about 0.2 mol of solvent extract, 0.25 mol of paraformaldehyde, and 0.1 mol of toluene in the presence of 0.1 mol of phosphorus oxychloride, was superior and showed the greatest plasticizing action on polyvinyl chloride. The use of anhydrous aluminum chloride in combination with toluene resulted in a product which was inferior to the products made using phosphorus oxychloride.

The foregoing experiments show that the condensation of aromatic solvent extracts with paraformaldehyde and various quantities of toluene, in the presence of phosphorus oxychloride as the condensing agent, produces products varying from an unctuous solid to an oil of medium viscosity as the proportion of toluene is increased. The unctuous solid was the best of these products as a plasticizing agent for polyvinyl chloride.

In order to demonstrate the effect of the added aromatic hydrocarbon, such as the toluene, the condensation reaction was repeated using the same conditions and quantities of reactants as set forth in Table III, except that the toluene was omitted.

EXAMPLE 6

Thirty grams of Solvent Extract No. 19, 7.5 g. of paraformaldehyde, and 15.3 g. of phosphorus oxychloride were stirred together for three hours at 82–106° F. The product, after isolation in the manner just described, was a black, tarry solid (29.5 grams). When tested as a plasticizer for polyvinyl chloride, the black tarry solid was found to have no plasticizing action whatever. This shows that the lower-boiling aromatic hydrocarbon is an essential component to obtain the desired droducts.

In Table IV, additional physical properties of Solvent Extracts Nos. 19 and 20, found to be especially suitable for obtaining good plasticizers, are given.

TABLE IV

| | Solvent ext. No. 19 from 200/85 neut. manufacture | Solvent ext. No. 20 from 170/100 neut. manufacture |
|---|---|---|
| Boiling range: | | |
| IBP, ° F | Approx. 665 | Approx. 665. |
| 10% | 752 | 732. |
| 50% | 820 | 820. |
| EP | 890+ | 885+. |
| Aniline pt., ° F | 58.0 | 85.6 (85.6–97.9). |
| Refractive index | 1.557 (N$_D^{20°}$ C.) | 1.561 (1.551–1.575) (N$_D^{20°}$ C.). |
| Color (ASTM) | 3.0 dil (7+ to 3.5 dil) | 2.5 dil (6+ to 6.0 dil). |

In general, solvent extracts from the manufacture of 170/100 and 200/85 neutral oils, found useful in accordance with this invention, exhibit the following indicated properties:

TABLE V

| Characteristic | Solvent extract from 200/85 neutral manufacture | Solvent extract from 170/100 neutral manufacture |
|---|---|---|
| Vis. at— | | |
| 100° F | 911–2,428 | 901–1,683 |
| 210° F | 60.4–75.1 | 59.6–69.6 |
| VI | −67 to −146 | −11 to −91 |
| Pour ° F | +20 to +70 | 20 to 50 |
| Percent sulfur | 2.6–3.2 | 2.4–2.9 |
| API gravity | 7.7–12.1 | 10.0–13.0 |
| Flash ° F | 410–450 | 390–435 |

In order to further demonstrate the invention, the following examples are presented:

EXAMPLE 7

A mixture of about 600 g. of solvent extract, 600 g. (7.7 moles) of benzene, 60 g. (2 moles) of paraformaldehyde, and 60 g. of pulverized zinc chloride is heated to about 90° F. with stirring. The reaction mixture is maintained at this temperature while a stream of hydrogen chloride is passed into the mass for about 30 minutes to 1 hour. The organic layer is decanted, washed with water, and then with dilute sodium bicarbonate solution. The washed, organic product is dried over calcium chloride and fractionally distilled to remove excess benzene. The final yield of condensed product is about 620 g. and the product is non-volatile at 650°.

EXAMPLE 8

A mixture of about 500 g. of Solvent Extract No. 1, 600 g. (7.7 moles) of benzene, 60 g. (2 moles) of paraformaldehyde, and 60 g. of pulverized zinc chloride is heated to about 90° F. with stirring. The reaction mixture is maintained at this temperature while a stream of hydrogen chloride is passed into the mass for about 30 minutes to 1 hour. The organic layer is decanted, washed with water, and then with dilute sodium bicarbonate solution. The washed, organic product is dried over calcium chloride and fractionally distilled to remove excess benzene. The final yield of condensed product is about 525 g., and the product is non-volatile at 650°.

EXAMPLE 9

A mixture of about 550 g. of Solvent Extract No. 9, 600 g. (7.7 moles) of benzene, 60 g. (2 moles) of paraformaldehyde, and 60 g. of pulverized zinc chloride is heated to about 90° F. with stirring. The reaction mixture is maintained at this temperature while a stream of hydrogen chloride is passed into the mass for about 30 minutes to 1 hour. The organic layer is decanted, washed with water, and then with dilute sodium bicarbonate solution. The washed, organic product is dried over calcium chloride and fractionally distilled to remove excess benzene. The final yield of condensed product is about 620 g. and the product is non-volatile at 650°.

EXAMPLE 10

A mixture of about 300 g. of solvent extract, 288 g. (2.25 moles) of naphthalene, 90 g. (3 moles) of paraformaldehyde, and 135 cc. of syrupy phosphoric acid is heated, with constant stirring at 100°–150° F. for about 6 hours. About 3 liter of cold water is added to the reaction mixture. The aqueous layer is separated from the viscous oily layer, which is then washed two or three times with 2-liter portions of cold water. The oil layer is distilled to remove unreacted naphthalene. The residue comprises the reaction product of this invention.

EXAMPLE 11

A viscous mixture of about 300 g. of solvent extract, 288 g. (2.25 moles) of naphthalene, 90 g. (3 moles) of paraformaldehyde, and 280 cc. of concentrated hydrochloric acid is heated, with constant stirring, at 100°–150° F. for about 6 hours. The reaction mixture is treated with about 3 liters of cold water. The aqueous layer is separated from the viscous oily layer, which is then washed two or three times with 2-liter portions of cold water. The oil layer is distilled to remove unreacted naphthalene. The residue comprises the reaction product of this invention.

As seen from the foregoing description of the invention and the examples, the mole ratios of reactants may be varied within considerable limits while still producing a product which is characterized by its plasticizing properties. In carrying out the reaction it is preferred that the amount of aliphatic reactant, lower-boiling aromatic, and condensation agent be at least the same as or greater than the amount of reactable polynuclear aromatic hydrocarbon. Thus, for each mole of complex aromatic hydrocarbon in the solvent extract, about 2 moles of each of aliphatic reactant, lower-boiling aromatic hydrocarbon, and condensation agent is applied successfully in the reaction. Within the foregoing limits, the amount of aliphatic reactant and added lower-boiling aromatic hydrocarbon may vary from about 0.5 mole to 2.5 moles, and the amount of condensation agent may vary from 0.25 mole to 2.5 moles.

From the foregoing description, it is obvious that certain changes can be made in the product and process without departing from the spirit of the invention. The only limitations attaching to the invention appear in the appended claims.

What is claimed is:

1. The process of producing condensation products which comprises reacting solvent extracts obtained from the solvent extraction of mineral lubricating oils, which solvent extracts are characterized by being complex, polynuclear, aromatic, alkyl-aromatic and heterocyclic compounds predominating in carbon and hydrogen, containing about 2.0 to 3.2 weight percent of sulfur and also containing oxygen and nitrogen, having average molecular weights in the order of 300 to 600, boiling in the range of about 400° to 1026° F. and having about 1.7 to 3.5 average number of rings per aromatic molecule, with an aldehyde of the group consisting of formaldehyde and paraformaldehyde and an aromatic compound of the group consisting of benzene, toluene, and naphthalene and their mixtures, in the presence of a condensation agent of the group consisting of phosphorous oxychloride, aluminum chloride, zinc chloride, phosphoric acid and concentrated hydrochloric acid at a temperature of about 68° to 212° F. and recovering a resinous condensation product therefrom.

2. The process in accordance with claim 1 in which about 0.2 mol of said solvent extract, 0.25 mol of said aldehyde and between about 0.1 to 0.8 mol of said aromatic compound are reacted.

3. The process in accordance with claim 1 in which said solvent extract is obtained in the solvent extraction of mineral lubricating oils to prepare 200/85 neutral oils.

4. The process in accordance with claim 1 in which said solvent extract is obtained in the solvent extraction of mineral lubricating oils to prepare 170/100 neutral oils.

5. The process in accordance with claim 1 in which said aldehyde is paraformaldehyde.

6. The process in accordance with claim 1 in which said condensation agent is phosphorus oxychloride.

7. The process of producing resinous condensation products which comprises reacting solvent extracts obtained from the solvent extraction of mineral lubricating oils, which solvent extracts are characterized by being complex, polynuclear aromatic, alkyl-aromatic and heterocyclic compounds predominating in carbon and hydrogen, containing about 2.0 to 3.2 weight percent of sulfur and also containing oxygen and nitrogen, having average molecular weights of about 300 to 600, boiling in the range of about 400° to 1026° F., and having about 1.7 to 3.5 average number of rings per aromatic molecule, with paraformaldehyde and toluene in the presence of phosphorus oxychloride at a temperature of about 68° to 212° F., and recovering a resinous condensation product.

8. The process in accordance with claim 7 in which about 0.2 mol of said solvent extract, 0.25 mol of said paraformaldehyde and between about 0.1 to 0.8 mol of said toluene are reacted.

9. The resinous condensation products of solvent extracts obtained from the solvent extraction of mineral lubricating oils, which solvent extracts are characterized by being complex, polynuclear aromatic, alkyl-aromatic and heterocyclic compounds predominating in carbon and hydrogen, containing about 2.0 to 3.2 weight percent of sulfur and also containing oxygen and nitrogen, having average molecular weights of about 300 to 600, boiling in the range of about 400° to 1026° F., and having about 1.7 to 3.5 average number of rings per aromatic molecule, and paraformaldehyde and toluene in the presence of phosphorus oxychloride at a temperature of about 68° to 212° F.

10. A plasticizing agent for polyvinyl chloride comprising the condensation product of about 0.2 mol of solvent extract obtained from the solvent extraction of mineral lubricating oils, which solvent extracts are characterized by being complex, polynuclear aromatic, alkyl-aromatic and heterocyclic compounds predominating in carbon and hydrogen, containing about 2.0 to 3.2 weight percent of sulfur and also containing oxygen and nitrogen, having average molecular weights of about 300 to 600, boiling in the range of about 400° to 1026° F., and having about 1.7 to 3.5 average number of rings per aromatic molecule, with about 0.25 mol of paraformaldehyde and between about 0.1 to 0.8 mol of toluene at a temperature of about 68° to 212° F.

References Cited in the file of this patent
UNITED STATES PATENTS

| | | |
|---|---|---|
| 2,597,159 | May et al. | May 20, 1952 |
| 2,713,571 | Gordon et al. | July 19, 1955 |
| 2,761,885 | De Jong et al. | Sept. 4, 1956 |

FOREIGN PATENTS

| | | |
|---|---|---|
| 922,670 | Germany | Jan. 20, 1955 |